April 27, 1937.  M. L. CLARK  2,078,650
PORTABLE FOOD CARRIER AND HEATER
Filed May 21, 1936
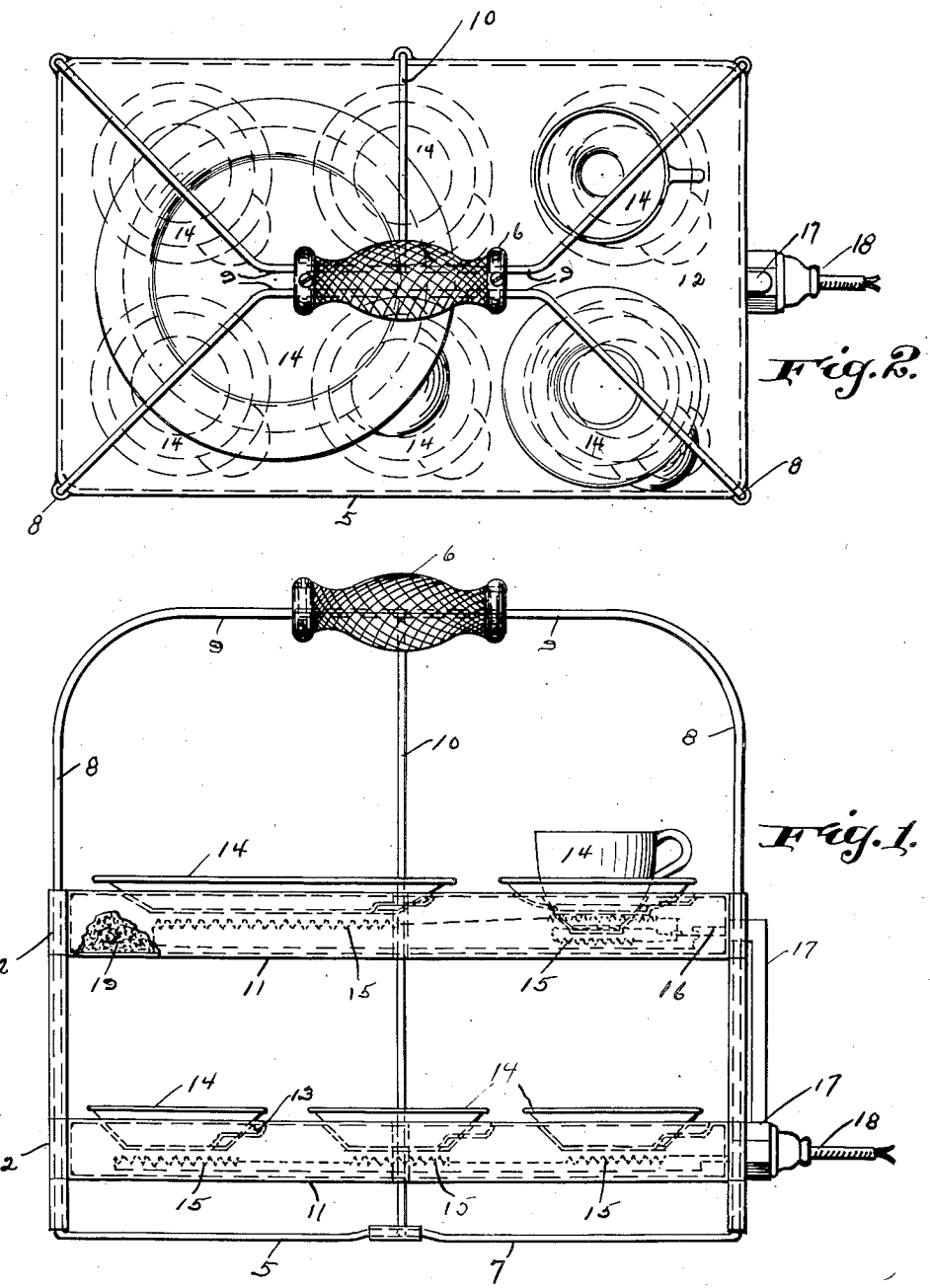
INVENTOR.
MARY L. CLARK
BY
J. T. Dowling
ATTORNEYS.

Patented Apr. 27, 1937

2,078,650

UNITED STATES PATENT OFFICE 2,078,650

PORTABLE FOOD CARRIER AND HEATER

Mary L. Clark, Baltimore, Md.

Application May 21, 1936, Serial No. 80,967

1 Claim. (Cl. 219—19)

My invention relates to certain new and useful improvements in a portable food carrier and heater and has for its principal object the provision of a device wherein eatables can be kept warm or in a heated condition at all times.

A further object of this invention is the provision of a portable food carrier and heater having a supporting frame and handle therefor and superposed trays carried by the frame and provided with article supporting recesses therein, to provide a means whereby eatables can be transported from place to place when desired.

A further object of the invention is the provision of a supporting frame, a series of article supporting trays, heating elements carried by the trays, an electrical source for the heating elements, and means formed in the trays about said heating elements for the support of food containing articles wherein the contents of said articles can be heated and kept in said heated condition as long as desired.

Another and important object of this invention is the provision of a portable food carrier and heater equipped with heating trays having article supporting recesses therein, which provide means whereby food can be transported and heated at all times wherever there is an electrical supply source.

Heretofore, particularly in sick rooms and other places, when food has been carried on trays or other devices adapted for the purpose, it has been found impossible to keep the food warm and appetizing, and to overcome this serious objection is the aim of the present invention, and the present invention inculcates a food carrier and heater combined, the trays of the carrier being provided with recesses which have located therein and properly insulated, suitable heating elements, food supporting articles adapted to rest in these recesses and a heat supplying connection carried by the frame to permit the elements of the trays to be heated at any given point and for any length of time to keep the contents of the articles warm and appetizing at all times.

A further and important object of this invention is the provision of a device of the class described, which can be made at a comparatively small cost, easy to manufacture, and one which would have many uses.

With these and other objects in view, the invention consists in certain novel features, combination and arrangement of parts as will be hereinafter more fully described, pointed out in the accompanying drawing, and claimed.

In the drawing,

Figure 1 is a front elevational view of my improved portable food carrier and heater as made in accordance with this invention; and, Figure 2 is a top plan view of the same.

Referring to the drawing, the numeral 5 indicates a substantially rectangular frame made of wire or any other material suitable for the purpose and has its ends terminating into a handle 6, as clearly illustrated in Figures 1 and 2 of the drawing.

The frame 5 has a rectangular bottom supporting portion 7 with vertical uprights 8, the terminals of which are bent laterally at right angles and converge inwardly to provide handle 6 supporting elements 9. To provide a reenforcement or anchoring member to prevent tilting of the frame when being transported, I provide a support 10 which has its lateral end secured to the handle 6 and its free portion connected to one side and bottom of the frame 5, as clearly illustrated in Figures 1 and 2 of the drawing.

It can be readily seen that this anchoring or reenforcing member 10 prevents lateral tilting of the frame when being carried by the supporting handle 6.

Secured to the vertical uprights 8 of the frame 5 are supporting trays 11, which are arranged in superposed relation, and as the construction is identical the description of one will serve for all.

The trays 11 are interposed within the bars 8 and are connected thereto as at 12. Each tray is provided in its upper surface with suitable recesses 13 to receive therein food supporting articles 14. It is to be understood that these recesses 13 can be of various sizes and configurations to accommodate different sized and shaped food supporting articles 14 therein.

Secured within the trays 11 and intersecting the recesses 13 is a heating element 15 and this heating element is of the usual well known type and terminates into the usual socket, as at 16, to receive the terminals of a switch plug 17 from an electrical supply source 18, so that the heating element may be energized for the purpose of heating the food supporting articles 14 and the contents thereof. This heating element 15 is provided with the usual insulating material 19 for the purpose of retarding and confining the heat within the trays 11.

The depth of the recesses 13 is optional but is herein shown as being sufficient to permit ample space between the articles 14 and the upper walls of the trays 11 so that these articles can be removed freely and easily from their respective recesses when it is desired to serve or use the contents of the food supporting articles 14.

In use, it is only necessary to place the food supporting articles in their respective recesses, filling the same with the proper eatables, and then convey the carrier and heater to its proper destination and insert the plug 18, which energizes the heating element 15 and the contents of the articles 14 will be kept in a warm and heated condition as long as desired.

Certain and minor changes may be resorted to in the construction of the device without departing from the spirit and scope of the invention as claimed.

Having thus described my invention, what I claim as new is:

A portable food carrier and heater, comprising a rectangular frame having vertical uprights, the terminals of which are bent laterally at right angles and inwardly to provide a handle supporting member, superposed trays secured to the uprights of the frame, said trays provided with article supporting recesses, insulated heating elements in said trays about said recesses, and an electrical supply source for said heating elements.

MARY L. CLARK.